US010534802B2

(12) United States Patent
Baluja et al.

(10) Patent No.: US 10,534,802 B2
(45) Date of Patent: Jan. 14, 2020

(54) NONSTANDARD LOCALITY-BASED TEXT ENTRY

(71) Applicant: Google Inc., Mountain View, CA (US)

(72) Inventors: Shumeet Baluja, Leesburg, VA (US); Maryam Kamvar, San Francisco, CA (US); Elad Gil, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/671,994

(22) Filed: Aug. 8, 2017

(65) Prior Publication Data

US 2018/0032604 A1 Feb. 1, 2018

Related U.S. Application Data

(63) Continuation of application No. 14/636,020, filed on Mar. 2, 2015, now abandoned, which is a continuation of application No. 11/173,702, filed on Jun. 30, 2005, now Pat. No. 8,972,444, which is a continuation-in-part of application No. 10/876,989, filed on Jun. 25, 2004, now Pat. No. 8,392,453.

(51) Int. Cl.
*G06F 16/33* (2019.01)
*G06F 16/951* (2019.01)
*G06F 17/27* (2006.01)
*H04M 1/725* (2006.01)
*G06N 7/00* (2006.01)
*G06F 3/023* (2006.01)

(52) U.S. Cl.
CPC .......... *G06F 16/334* (2019.01); *G06F 3/0237* (2013.01); *G06F 16/951* (2019.01); *G06F 17/276* (2013.01); *G06F 17/2735* (2013.01); *G06N 7/005* (2013.01); *H04M 1/72572* (2013.01); *H04M 1/72561* (2013.01); *H04M 2250/10* (2013.01); *H04M 2250/70* (2013.01)

(58) Field of Classification Search
USPC .............................................. 707/3
See application file for complete search history.

(56) References Cited

U.S. PATENT DOCUMENTS 4,674,112 A 6/1987 Kondraske et al.
4,754,474 A 6/1988 Feinson
(Continued)

FOREIGN PATENT DOCUMENTS

CA 2511293 6/2004
EP 0597611 B1 5/1994
(Continued)

OTHER PUBLICATIONS

Examination Report from counterpart European Application No. 06786338.1, dated Dec. 11, 2017, 6 pp.
(Continued)

*Primary Examiner* — Christyann R Pulliam
*Assistant Examiner* — Raheem Hoffler
(74) *Attorney, Agent, or Firm* — Colby Nipper

(57) ABSTRACT

A computer-implemented method of providing text entry assistance data includes receiving at a system location information associated with a user, receiving at the system information indicative of predictive textual outcomes, generating dictionary data using the location information, and providing the dictionary data to a remote device.

21 Claims, 8 Drawing Sheets

(56) References Cited

U.S. PATENT DOCUMENTS

| | | |
|---|---|---|
| 5,337,347 A | 8/1994 | Halstead-Nussloch et al. |
| 5,418,717 A | 5/1995 | Su |
| 5,495,608 A | 2/1996 | Antoshenkov |
| 5,500,920 A * | 3/1996 | Kupiec ............... G10L 15/1815 704/270.1 |
| 5,634,053 A | 5/1997 | Noble et al. |
| 5,634,134 A | 5/1997 | Kumai et al. |
| 5,696,962 A | 12/1997 | Kupiec |
| 5,701,469 A | 12/1997 | Brandli et al. |
| 5,724,593 A | 3/1998 | Hargrave et al. |
| 5,745,894 A | 4/1998 | Burrows et al. |
| 5,758,145 A | 5/1998 | Bhargava et al. |
| 5,778,157 A | 7/1998 | Oatman et al. |
| 5,818,437 A | 10/1998 | Grover et al. |
| 5,845,273 A | 12/1998 | Jindal |
| 5,915,251 A | 6/1999 | Burrows et al. |
| 5,945,928 A | 8/1999 | Kushler et al. |
| 5,953,073 A | 9/1999 | Kozina et al. |
| 5,953,541 A | 9/1999 | King et al. |
| 5,978,792 A | 11/1999 | Bhargava et al. |
| 5,978,820 A | 11/1999 | Mase et al. |
| 6,011,554 A | 1/2000 | King et al. |
| 6,026,411 A | 2/2000 | Delp |
| 6,038,365 A | 3/2000 | Yamagami |
| 6,061,718 A | 5/2000 | Nelson |
| 6,070,140 A | 5/2000 | Tran |
| 6,131,082 A | 10/2000 | Hargrave et al. |
| 6,169,999 B1 | 1/2001 | Kanno |
| 6,185,558 B1 | 2/2001 | Bowman et al. |
| 6,226,635 B1 | 5/2001 | Katariya |
| 6,247,010 B1 | 6/2001 | Doi et al. |
| 6,256,630 B1 | 7/2001 | Gilai et al. |
| 6,278,992 B1 | 8/2001 | Curtis et al. |
| 6,286,064 B1 | 9/2001 | King et al. |
| 6,307,548 B1 | 10/2001 | Flinchem et al. |
| 6,307,549 B1 | 10/2001 | King et al. |
| 6,353,820 B1 | 3/2002 | Edwards |
| 6,360,196 B1 | 3/2002 | Poznanski et al. |
| 6,377,961 B1 | 4/2002 | Ryu |
| 6,377,965 B1 | 4/2002 | Hachamovitch et al. |
| 6,421,662 B1 | 7/2002 | Karten |
| 6,453,315 B1 | 9/2002 | Weissman et al. |
| 6,477,524 B1 | 11/2002 | Taskiran |
| 6,484,179 B1 | 11/2002 | Roccaforte |
| 6,529,903 B2 | 3/2003 | Smith et al. |
| 6,542,170 B1 | 4/2003 | Williams et al. |
| 6,606,486 B1 | 8/2003 | Cubbage et al. |
| 6,633,846 B1 | 10/2003 | Bennett et al. |
| 6,675,165 B1 | 1/2004 | Rothschild |
| 6,714,905 B1 | 3/2004 | Chang et al. |
| 6,795,822 B1 | 9/2004 | Matsumoto et al. |
| 6,859,800 B1 * | 2/2005 | Roche ............... G06F 17/30663 707/718 |
| 6,947,770 B2 | 9/2005 | Rydbeck |
| 6,968,179 B1 | 11/2005 | De Vries |
| 7,103,854 B2 | 9/2006 | Fuchs et al. |
| 7,120,574 B2 | 10/2006 | Troyanova et al. |
| 7,149,550 B2 | 12/2006 | Kraft |
| 7,159,191 B2 | 1/2007 | Koivuneimi |
| 7,240,061 B2 * | 7/2007 | Fukushima ............ G06F 16/30 |
| 7,283,992 B2 | 10/2007 | Liu et al. |
| 7,366,668 B1 | 4/2008 | Franz et al. |
| 7,369,988 B1 | 5/2008 | Thenthiruperai et al. |
| 7,380,724 B2 | 6/2008 | Unruh |
| 7,380,998 B2 | 6/2008 | Mihara et al. |
| 7,461,061 B2 | 12/2008 | Aravamudan et al. |
| 7,529,741 B2 | 5/2009 | Aravamudan et al. |
| 7,536,384 B2 | 5/2009 | Venkataraman et al. |
| 7,539,676 B2 | 5/2009 | Aravamudan et al. |
| 7,644,054 B2 | 1/2010 | Garg et al. |
| 7,647,228 B2 | 1/2010 | Silvera et al. |
| 7,657,526 B2 | 2/2010 | Aravamudan et al. |
| 7,729,913 B1 | 6/2010 | Lee et al. |
| 7,737,999 B2 | 6/2010 | Ardhanari et al. |
| 7,739,280 B2 | 6/2010 | Aravamudan et al. |
| 7,774,294 B2 | 8/2010 | Aravamudan et al. |
| 7,774,341 B2 | 8/2010 | Aravamudan et al. |
| 7,778,266 B2 | 8/2010 | Venkataraman et al. |
| 7,779,011 B2 | 8/2010 | Venkataraman et al. |
| 7,788,266 B2 | 8/2010 | Venkataraman et al. |
| 7,792,815 B2 | 9/2010 | Aravamudan et al. |
| 7,835,998 B2 | 11/2010 | Aravamudan et al. |
| 7,840,405 B1 | 11/2010 | Lee et al. |
| 8,392,453 B2 | 3/2013 | Baluja |
| 8,972,444 B2 | 3/2015 | Baluja et al. |
| 2001/0032074 A1 | 10/2001 | Harris et al. |
| 2002/0019731 A1 | 2/2002 | Masui et al. |
| 2002/0021311 A1 | 2/2002 | Shechter et al. |
| 2002/0028697 A1 | 3/2002 | Davies |
| 2002/0038308 A1 | 3/2002 | Cappi |
| 2002/0059069 A1 | 5/2002 | Hsu et al. |
| 2002/0077811 A1 | 6/2002 | Koenig et al. |
| 2002/0087514 A1 | 7/2002 | Payne et al. |
| 2002/0091511 A1 | 7/2002 | Hellwig et al. |
| 2002/0152203 A1 | 10/2002 | Ostergaard et al. |
| 2002/0184197 A1 | 12/2002 | He et al. |
| 2002/0184206 A1 | 12/2002 | Evans |
| 2002/0194388 A1 | 12/2002 | Boloker et al. |
| 2003/0035519 A1 | 2/2003 | Warmus |
| 2003/0054830 A1 | 3/2003 | Williams |
| 2003/0073451 A1 | 4/2003 | Kraft |
| 2003/0078914 A1 | 4/2003 | Witbrock |
| 2003/0088554 A1 | 5/2003 | Ryan et al. |
| 2003/0104839 A1 | 6/2003 | Kraft et al. |
| 2003/0105623 A1 | 6/2003 | Cyr et al. |
| 2003/0125947 A1 | 7/2003 | Yudkowsky |
| 2003/0131319 A1* | 7/2003 | Hintz ................ G06F 17/2735 715/236 |
| 2003/0135490 A1 | 7/2003 | Barrett et al. |
| 2003/0149686 A1 | 8/2003 | Drissi et al. |
| 2003/0163473 A1* | 8/2003 | Miller ............... G06F 17/30616 |
| 2003/0171929 A1 | 9/2003 | Falcon et al. |
| 2003/0187658 A1 | 10/2003 | Selin et al. |
| 2003/0204394 A1 | 10/2003 | Garudadri et al. |
| 2004/0054661 A1 | 3/2004 | Cheung et al. |
| 2004/0128135 A1 | 7/2004 | Anasatasakos et al. |
| 2004/0163032 A1 | 8/2004 | Guo et al. |
| 2004/0192355 A1 | 9/2004 | Nowlan |
| 2004/0249628 A1 | 12/2004 | Chelba et al. |
| 2004/0252051 A1 | 12/2004 | Johnson |
| 2004/0261021 A1 | 12/2004 | Mittal et al. |
| 2005/0027524 A1 | 2/2005 | Wu et al. |
| 2005/0060448 A1 | 3/2005 | Gutowitz |
| 2005/0065931 A1 | 3/2005 | Ebrahimi |
| 2005/0071332 A1* | 3/2005 | Ortega ............... G06F 17/2725 |
| 2005/0080772 A1* | 4/2005 | Bem .................... G06F 16/951 |
| 2005/0102259 A1 | 5/2005 | Kapur |
| 2005/0114312 A1 | 5/2005 | Mosescu |
| 2005/0131687 A1 | 6/2005 | Sorrentino |
| 2005/0165819 A1* | 7/2005 | Kudoh ............... G06F 16/355 |
| 2005/0188330 A1 | 8/2005 | Griffin |
| 2005/0198056 A1 | 9/2005 | Dumais et al. |
| 2005/0246365 A1 | 11/2005 | Lowles et al. |
| 2005/0270270 A1 | 12/2005 | Chadha |
| 2005/0289141 A1 | 12/2005 | Baluja |
| 2005/0289479 A1 | 12/2005 | Yoshida et al. |
| 2006/0041590 A1 | 2/2006 | King et al. |
| 2006/0099963 A1 | 5/2006 | Stephens |
| 2006/0142997 A1 | 6/2006 | Jakobsen et al. |
| 2006/0149742 A1* | 7/2006 | Egnor .................... G06F 17/27 |
| 2006/0156233 A1 | 7/2006 | Nurmi |
| 2006/0230350 A1 | 10/2006 | Baluja |
| 2006/0241933 A1 | 10/2006 | Franz |
| 2007/0006131 A1 | 1/2007 | Kiffmeier |
| 2007/0061211 A1 | 3/2007 | Ramer et al. |
| 2007/0061244 A1 | 3/2007 | Ramer et al. |
| 2007/0061321 A1 | 3/2007 | Venkataraman et al. |
| 2007/0066124 A1 | 3/2007 | Park et al. |
| 2007/0192318 A1 | 8/2007 | Ramer et al. |
| 2007/0195063 A1 | 8/2007 | Wagner et al. |
| 2008/0104043 A1 | 5/2008 | Garg et al. |
| 2010/0093404 A1 | 4/2010 | Baek et al. |
| 2015/0269252 A1 | 9/2015 | Baluja et al. |

(56) References Cited

U.S. PATENT DOCUMENTS

FOREIGN PATENT DOCUMENTS

| EP | 1072984 | 1/2001 |
|---|---|---|
| JP | H11025084 | 1/1999 |
| JP | 2000508093 | 6/2000 |
| JP | 2001325252 | 11/2001 |
| JP | 2002506256 | 2/2002 |
| JP | 2003067419 | 3/2003 |
| JP | 2003150589 A | 5/2003 |
| JP | 2003296212 | 10/2003 |
| JP | 2003303186 | 10/2003 |
| JP | 2003330916 | 11/2003 |
| JP | 2004070547 | 3/2004 |
| KR | 20020084739 | 11/2002 |
| KR | 20030044940 | 6/2003 |
| PH | 11025084 | 1/1999 |
| RU | 2039376 C1 | 9/1995 |
| WO | 98/00833 | 1/1998 |
| WO | 0075808 A1 | 12/2000 |
| WO | 200180079 | 3/2001 |
| WO | 0180079 A2 | 10/2001 |
| WO | 2002001400 | 1/2002 |
| WO | 2002009302 | 1/2002 |
| WO | 03042879 | 5/2003 |
| WO | 2005091825 | 10/2005 |

OTHER PUBLICATIONS

"Problem 6-Mobile Phones," ACM SPPC International Collegiate Programming Contest 2003, Sep. 20, 2003, http://www.sspcontest.org.2003/P6_Mobiles.pdf., 2 pp.
Australian Official Action from counterpart Australian Application No. 2011201265, dated Aug. 29, 2012, 4 pp.
Australian Official Action from counterpart Australian Application No. 2011201265, dated Oct. 17, 2013.
Communication from counterpart European Patent Application No. 09151235.0, dated Jul. 6, 2009, 7 pp.
European Examination Report from counterpart European Application No. 05763513, dated Feb. 24, 2010, 4 pp.
European Search Report and Written Opinion from counterpart European Application No. 05763513.8, dated Jul. 23, 2009, 3 pp.
International Preliminary Report on Patentability for Application No. PCT/US2007/082534, dated May 7, 2009, 6 pages.
Australian Official Action for Application No. 2011201265, dated Aug. 29, 2012, 4 pages.
Australian Official Action for Application No. 2011201265, dated Oct. 17, 2013.
Extended European Search Report dated Nov. 27, 2012 in European Application No. 06786338.1, 7 pages.
Gon, et al., "Alphabetically Constrained Keypad Designs for Text Entry on Mobile Devices," HCI Laboratory, College of Computer & Information Science, Northeastern University, Apr. 2-7, 2005, pp. 211-212.
European Patent Office, Supplementary European Search Report & Written Opinion for Application No. EP 05763513.8, dated Jul. 23, 2009, 3 pages.
European Patent Office, European Application 05763513, filed Jun. 24, 2005, in Examination Report, dated Feb. 24, 2010, 4 pages.
United State Patent and Trademark Office, U.S. Appl. No. 10/876,989, filed Jun. 30, 2005, in Office Action dated Dec. 22, 2009, 23 pages.
United State Patent and Trademark Office, U.S. Appl. No. 10/876,989, filed Jun. 30, 2005, in Office Action dated Jan. 3, 2007, 18 pages.
United State Patent and Trademark Office, U.S. Appl. No. 10/876,989, filed Jun. 30, 2005, in Office Action dated Jun. 6, 2008, 17 pages.
United State Patent and Trademark Office, U.S. Appl. No. 10/876,989, filed Jun. 30, 2005, in Office Action dated Mar. 9, 2009,23 pages.
United State Patent and Trademark Office, U.S. Appl. No. 10/876,989, filed Jun. 30, 2005, in Office Action dated Sep. 18, 2007, 14 pages.
International Preliminary Report and Patentability from PCT/US2005/022962, dated Oct. 11, 2007, 8 pp.
International Preliminary Report on Patentability from PCT/US2006/26152, dated Mar. 26, 2009, 7 pp.
International Search Report and Written Opinion from PCT/US2005/022962, dated Sep. 17, 2007, 13 pp.
International Search Report and Written Opinion from PCT/US2006/26152, dated Feb. 11, 2008, 9 pp.
International Search Report and Written Opinion from PCT/US2007/082534, dated Jan. 14, 2008, 10 pp.
Jun Gong and Peter Tarasewich, Alphabetically Constrained Keypad Designs for Text Entry on Mobile Devices, HCI Laboratory, College of Computer & Information Science, Northeastern University, pp. 211-212, Apr. 2-7, 2005.
Kuwahara, Yoshiko, Authorized Officer, International Bureau of WIPO, International application No. PCT/US2006/26152, filed Jun. 30, 2006, in International Preliminary Report on Patentability, dated Mar. 26, 2009, 7 pages.
Non Final Office Action from counterpart Japanese Application No. 2014-133829, dated Jun. 1, 2015, 6 pp.
Offical Decision of Grant from counterpart Russian Application No. 2006114696 dated Jan. 23, 2009.
Office Action from Chinese Application No. 200780046991.5, dated Apr. 20, 2011, 7 pp.
Office Action from counterpart Australian Application No. 2005259925, dated Feb. 18, 2010, 3 pp.
Office Action from counterpart Canadian Patent Application No. 2572215, dated Jun. 21, 2012, 5 pp.
Office Action from counterpart Chinese Patent Application No. 200680031513.2, dated Aug. 13, 2014, 14 pp.
Office Action from counterpart Chinese Patent Application No. 200680031513.2, dated May 24, 2010.
Office Action from counterpart Japanese Application No. 2008-520354, dated Dec. 13, 2011, 7 pp.
Office Action from counterpart Japanese Application No. 2013-141950, dated Mar. 31, 2014, 11 pp.
Office Action from counterpart Korean Application No. 2008-7002520, dated Jan. 28, 2013, 11 pp.
Office Action from Korean Application No. 2006-7006282, dated Mar. 10, 2011.
Australian Patent Office, Australian Application No. 2005259925, filed Jun. 24, 2005, in Office Action, dated Feb. 18, 2010, 3 pages.
Prosecution History from U.S. Appl. No. 11/173,702, dated Aug. 13, 2007 through Dec. 4, 2014, 192 pp.
Resnik P .. , et al., "The Web as a Parallel Corpus", Computational Linguistics MIT Press for Assoc. Comput. Linguistics USA, Jul. 2002, pp. 1-29, v. 29, No. 3.
Search Report from related European Patent Application No. 09151235.0 dated May 4, 2009, 7 pages.
Second Office Action from Chinese Application No. 200780046991.5, dated May 3, 2021, 5 pp.
Whitfield, A Jacqueline, Special Project Assistant, International Searching Authority, filed Jun. 24, 2005, in Intentional Search Report and Written Opinion, dated Sep. 7, 2007, 13 pp.
Wildstrom, Stephen H., "Honey, I Shrunk the Keyboard," Business Week, May 10, 2004, p. 30.
Young, W Lee, Authorized Officer, International Searching Authority, International application No. PCT/US2006/26152, filed Jun. 30, 2006, in International Search Report and Written Opinion, dated Feb. 11, 2008, 9 pages.
Prosecution History from U.S. Appl. No. 14/636,020, dated Oct. 15, 2015 through May 19, 2017, 104 pp.
Notice of Intent to Grant and Text Intended to Grant from counterpart European Application No. 06786338.1, dated Aug. 27, 2018, 63 pp.
Response to Article 94(3) Communication dated Dec. 11, 2017, from counterpart European Application No. 06786338.1, filed Apr. 23, 2018, 25 pp.
"Extended European Search Report", European Application No. 19150560.1, dated Apr. 10, 2019, 9 pages.
"Advisory Action", U.S. Appl. No. 10/876,989, dated Oct. 5, 2010, 3 pages.
"First Office Action", U.S. Appl. No. 10/876,989, dated Jul. 20, 2010, 24 pages.

(56) References Cited

OTHER PUBLICATIONS

"Non-Final Office Action", U.S. Appl. No. 10/876,989, dated Jul. 25, 2011, 23 pages.
"Notice of Allowance", U.S. Appl. No. 10/876,989, dated Nov. 5, 2012, 18 pages.
"Notice of Allowance", U.S. Appl. No. 10/876,989, dated Jun. 11, 2012, 19 pages.
"Pre-Brief Appeal Conference Decision", U.S. Appl. No. 14/636,020, dated Jul. 10, 2017, 2 pages.

* cited by examiner

NONSTANDARD LOCALITY-BASED TEXT ENTRY

CROSS-REFERENCE TO RELATED APPLICATION

This application is a continuation of U.S. patent application Ser. No. 14/636,020 filed on Mar. 2, 2015, which is a continuation of U.S. patent application Ser. No. 11/173,702 filed on Jun. 30, 2005, now U.S. Pat. No. 8,972,444, issued Mar. 3, 2015, which is a continuation-in-part of U.S. patent application Ser. No. 10/876,989, filed on Jun. 25, 2004, now U.S. Pat. No. 8,392,453, issued Mar. 5, 2013, which are hereby expressly incorporated by reference herein in their entireties.

TECHNICAL FIELD

This invention relates to assisting users of computing or communication devices in entering information, and more particularly to providing and updating dictionaries for disambiguating text entered by users.

BACKGROUND

As computers and computer networks become more and more able to access a wide variety of information, people are demanding more ways to obtain that information. Specifically, people now expect to have access, on the road, in the home, or in the office, to information previously available only from a permanently-connected personal computer hooked to an appropriately provisioned network. They want stock quotes and weather reports from their cell phones, e-mail from their personal digital assistants (PDAs), up-to-date documents from their palm tops, and timely, accurate search results from all their devices. They also want all of this information when traveling, whether locally, domestically, or internationally, in an easy-to-use, portable device.

Portability generally requires a device small in size, which in turn limits the number of data entry keys and the amount of memory and available processing power. In addition, ultra portable devices often must be held in one hand or not held at all, so that data entry must be one-handed or no-handed. These limitations in the device generally must be compensated for by the user. For example, the user may have to use a limited keyboard such as a telephone keypad, or limited speech recognition capabilities. Such constrained devices may force a user to learn special tricks for data entry (such as shorthand writing on a PDA) or may generate data that the user never intended, by making inaccurate guesses at ambiguous data entries.

Some attempts to solve these problems have been made. For example, PDAs have been programmed to recognize short-hand and long-hand writing. Also, cell phones can recognize entered letters, even though the presence of three letters on each key can create ambiguities about the intended text, such as by allowing the user to press key combinations, either simultaneously or in sequence (e.g., triple tap). Other solutions involve making educated guesses at what letters the user intended to enter, such as by identifying all possible terms that match a combination of pressed keys, and selecting the most common term or presenting the user with a list of possible terms sorted from most common to least common. These solutions all have limitations.

Even apart from portable, constrained devices, users want more text-entry intelligence in their computers. For example, users want systems that assist with data entry or correct errors in data entry, such as spell checkers and grammar checkers. Again, there are multiple solutions, but all have limitations.

Therefore, there is a need for a system that assists a user in entering data more quickly and more accurately, both in devices with full functionality and in constrained devices.

SUMMARY

This document discloses methods and systems that assist users of computing and communication devices in entering data into those devices. In one aspect, a computer-implemented method of providing text entry assistance data is disclosed. The method includes receiving at a system location information associated with a user, receiving at the system information indicative of predictive textual outcomes, generating dictionary data using the location information, and providing the dictionary data to a remote device. The received information indicative of predictive textual outcomes may relate to search requests made by a plurality of remote searchers. Also, the dictionary data may include a plurality of terms with a corresponding plurality of predictive weightings, and dictionary data may be generated using the information indicative of predictive textual outcomes).

In one implementation, providing the dictionary data to the remote device may include transmitting the data to a mobile phone. The system may also receive user preferences that are used in searching based on the search results. The generating of the dictionary data may also include producing data related to the information indicative of the user location. The generated dictionary data may be associated with places near the user location. Also, the generated dictionary data may be associated with common query data from users near the user location, and may be provided to the remote device in response to a request from the remote device. The dictionary data may also be compressed before it is provided to the remote device, and the data may include supplemental data for addition to a preexisting dictionary on the remote device.

In another implementation, the method may further include receiving a search request, generating a search result, and providing the search result along with the dictionary data. The dictionary data may include data from documents relating to the search result. In addition, the dictionary data may include data corresponding to one or more areas in the proximity of the user location, which may in turn comprise location names.

In another aspect, a data collection and distribution system is provided and includes a request processor to receive data requests from one or more remote clients, a local search engine to search in response to the data requests, a dictionary generator to produce information for use by the one or more clients containing predictive data entry information for the one or more clients, and a response formatter to receive information responsive to the data requests including predictive data entry information, and provide the information responsive to the data requests for use by the one or more clients. The request processor may be operable to receive information indicative of a user location. Also, the local search engine may be operable to extract information indicative of a user location from the data requests.

In one implementation, the dictionary generator may include a concurrence rater that calculates predicted concurrence scores for a plurality of objects, and the plurality of objects may include a plurality of terms that may be entered by a user in generating a data request. The system may also include an object selector to identify objects in a document for submission to the concurrence rater. The local search engine may also be operable to receive a plurality of requests and information indicative of a user location and provide the requests for transmission by the response formatter along with predictive data entry information. The information for use by the one or more clients may include data corresponding to one or more areas in the proximity of the user location, which may in turn comprise location names.

In yet another aspect, a computer-implemented system for providing information indicative of probable usage of objects by the user of a data entry device may include means for providing documents associated with a user location and indicative of usage by a user or users, a concurrence rater to analyze the documents for usage data of objects in the documents and to generate associated concurrence ratings, and an interface to transmit the concurrence ratings to a data entry device. The concurrence rater may further analyze the documents for location data of the objects and generates concurrence ratings, and the concurrence ratings may be at least partially based on how far a location associated with the location data of the object is from the user location. Also, the concurrence ratings may be at least partially based on preferences of a user.

In another aspect, a communication device includes a transceiver to receive and transmit information. The transmitted information includes information indicative of a user location. The device also includes a vocabulary repository containing information indicative of the probable intended usage of ambiguous information entered by a user of the device, the occurrence data reflecting an association of the user location with the information indicative of the probable intended usage, and a disambiguation engine to resolve the ambiguous information provided to the device to a probable solution by identifying possible solutions and to apply the information indicative of probable intended usage to the possible solutions.

In one implementation, the system may further include a positioning system used to obtain the information indicative of the user location. Also, a user may input the information indicative of the user location.

In another implementation, the preferences of a user may determine what information is contained in the vocabulary repository. Also, the indicative information associated with the occurrence data may be eliminated from the vocabulary repository when the occurrence data reaches a certain threshold. The occurrence data may contain data that represents usage practices by members of a demographic group.

The systems and techniques described here may provide one or more of the following advantages. A system may provide effective and automated text entry, and may provide for assistance when difficulties arise in entering text related to a user's location. Also, a system may assist a user by providing location-related suggestions for text entry. Such a system may allow for quick and more accurate data entry, without the need for excessive system requirements, so that the system can run in the background while other applications operate, and also can be implemented on portable systems, such as cellular telephones, having limited resources, such as memory.

The details of one or more embodiments of the invention are set forth in the accompanying drawings and the description below. Other features, objects, and advantages of the invention will be apparent from the description and drawings, and from the claims.

DESCRIPTION OF DRAWINGS

These and other aspects will now be described in detail with reference to the following drawings.

Like reference symbols in the various drawings indicate like elements.

DETAILED DESCRIPTION

The systems and techniques described here relate to assistance with data entry. The systems can take many forms, including personal communicators and personal computers. The data may also be entered in many forms, including by telephone keypad and voice. In general, the systems operate by identifying user-specific data so as to make more accurate disambiguating selections based upon, for example, a user's geographic location, previously-typed words, the user's self-selected profile, or information sources external to the user, but that are associated with the user or the user's selections.

Figure 1:
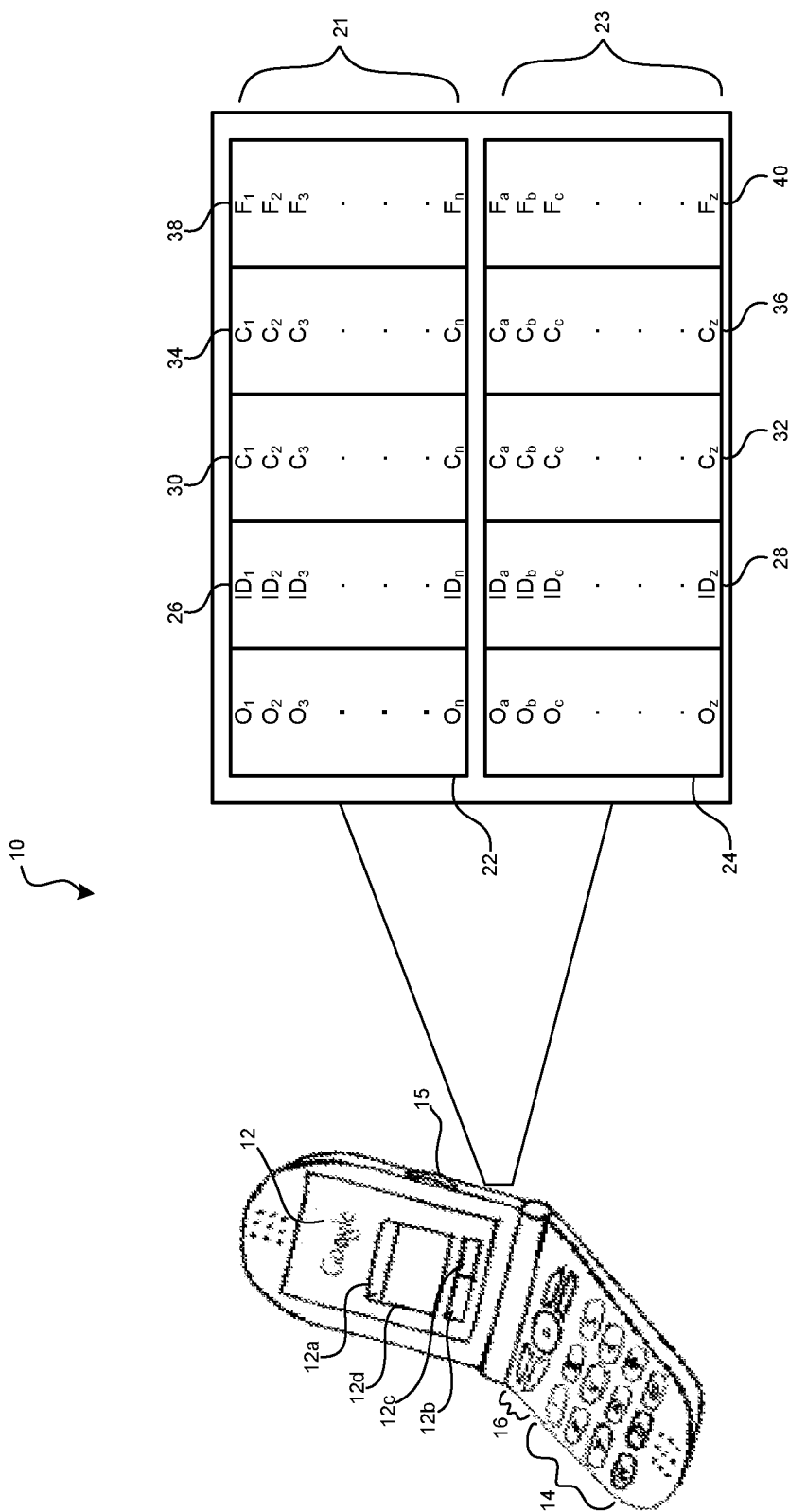
FIG. 1 shows schematically a data entry system having data disambiguation capabilities.

FIG. 1 shows a constrained data entry system 10 having data disambiguation capabilities. The system 10 as shown comprises a cellular telephone handset, but could take any appropriate form, such as a personal digital assistant, a personal computer, or a voice-driven personal communication device. In this embodiment, the system 10 has a display screen 12 that can be programmed to display any appropriate information to a user of the system 10. For example, the display screen 12 could be used to display information related to an Internet searching application, such as a search box 12a and related control buttons.

As shown, search box 12a may simply be a contrasting area on the screen that displays a search term as it is entered by the user. Search button 12b may submit the contents of search box 12a to a search engine, such as a search engine connected to the cellular network by the Internet. The display screen 12 may then display the results of the search. Alternatively, "I'm Feeling Lucky" button 12c may submit the search results, and the display screen 12 may then immediately display the page for the most appropriate match for the search.

Data may be entered into system 10 in any of a number of manners. Specifically, data entry keys 14 may be used to enter information such as alphanumeric characters, and may take the form of a standard telephone keypad, with alphabetic characters on the 2 through 9 keys. Other appropriate ways of entering alphanumeric information, including voice recognition, may also be used. As used here, references to entry of text encompass entry through a key board or by writing, and also other manners of data entry, such as by speaking to a voice-recognition enabled system.

In addition, control keys 16 may be provided, for example, to perform predetermined functions or programmed functions, or to control icons on display screen 12. Control keys 16 may also be used as supplemental keys, i.e., the number 0 could represent things other than 0, the "#" key may be used as a space key, the "*" key may be a proxy for the backspace key, and the "1" key may represent punctuation. Also, control wheel 15 may be provided on the side of the hand set to allow a user to scroll through selections shown on display screen 12, and to push inward to click on a desired selection. Other appropriate data presentation and data entry features may also be provided, particularly where the system 10 includes a full-sized personal computer, or where the system operates via voice control.

The system 10 may also be provided with features to allow for disambiguation of entered data. Entered data may be ambiguous, for example, because a term has not yet been entered completely, because each keystroke may represent multiple different letters (such as when the keypad is a standard telephone keypad), or because acquired speech was not clear or was incomplete. The ambiguities to be resolved may thus be both interpolative and extrapolative. Interpolative ambiguities occur when all of the data for a text entry has been entered, but multiple possible text may be represented by the data, such as when the data is entered on a telephone keypad. Extrapolative ambiguities occur when a user has entered some of the data for a text entry, but has not completed the data entry. In such a situation, the system may provide selections to complete the entry. The system may also determine when the user has finished entering the keystrokes for a word, such as when only one possible solution for the entered keystrokes exists.

Ambiguities may also be both interpolative and extrapolative at the same time, such as when a user has entered only part of a word using a single-tap method on a telephone keypad. Also, ambiguities may arise as to the data entry type, e.g., when the system cannot readily determine if a telephone user intends to enter numerals, text by single-tap, or text by multiple-tap methods.

In general, the disambiguation feature may operate by matching entries in a stored dictionary to those that are capable of matching the keystrokes entered to the system 10. The matched terms in the form of a solution set may be sorted in a manner that places the most likely match at the top of the set. A user may scroll through the solution set, such as by using control wheel 15, and select the desired data item. Also, the system may be set up to select a predicted match automatically without intervention by the user (but with the ability of the user to edit or override the selection in real-time or after the data is entered).

In FIG. 1, two dictionaries, a main dictionary 21 and a supplemental dictionary 23, are shown. Main dictionary 21 represents common terms that are generally used in a particular application, and may be provided with the system 10 when it is initially set up. Typically, such a main dictionary may contain around 20,000 words from a larger 100,000 word dictionary, although other sizes of dictionaries are permissible, depending on system capabilities. Also, the dictionaries are not limited to the English language, but may cover other languages having other characters, and even other types of objects.

Supplemental dictionary 23 represents additional data that may be added to the system 10 from time to time so as to give a user an even more personalized experience, and thereby provide more accurate disambiguation. For example, the supplemental dictionary 23 may include time-sensitive information that is regularly updated in an attempt to match likely data entry by the user. As an example, the supplemental dictionary 23 may be used in combination with a search engine so as to update a device with search terms that are closely related to those recently entered by the user, or terms that are currently popular with a broader array of users. The supplemental 23 dictionary may also be part of the main dictionary 21, so that new entries are simply added to main dictionary 21, and are not stored separately.

For example, if a user enters a search for "management theory," a search engine could look to other recent similar searches and provide the user's device with information about those other searches, such as other search terms entered soon after the identified search, or other terms used in documents that turn up as the result of a search. In addition, the search may also return data to the device to update probabilities for the occurrence of the words. In particular, other terms associated with a search can have their probabilities increased if the terms themselves already exist in the dictionary. For example, when "management theory" is provided as a search entry, terms such as "compensation," "Drucker," and "Deming" may be returned to the device and given prominence as solutions to future searches that they otherwise would not have had. Also, they may be added to the dictionary when they otherwise would not have been in the dictionary.

In general, and as an example, dictionaries 21, 23 may contain three pieces of information that assist in disambiguating text entry. First, they may contain the words or other objects themselves. Second, they may include the probability of each word or object being typed or selected. These probabilities may also be broken into sets of probabilities that depend on the application being used, as described in more detail below. Third, the dictionaries 21, 23 may include the concurrence, or co-concurrence, probability of each word with other words. For example, the entry for "paradigm" might indicate a high co-concurrence with the words "shift" or "change." In this manner, once the word "paradigm" is entered into a device, the words "shift" and "change" might be promoted to the top of the list of likely candidates for follow-up words.

Each of the pieces of information may be changed independently of the others. For example, if a user types a word very frequently, the probability of that word (whether in gross, or with respect to a particular application) can be increased. Similarly, only the co-concurrence probabilities may be updated also. Thus, probabilities can be updated independently of the entry of a particular word.

Also, once a word is typed, all of the probabilities associated with that word can be updated and revised. That is because, when a person uses a word, they are more likely to use it again soon in the near future. For example, a person searching for restaurants may enter the word "japanese" many times during a particular search session, until the person finds a good restaurant (and use of the word "japanese" might make it more likely the person will soon enter "sushi" because of the common co-concurrence between the words).

The concurrence data may be stored uniquely for separate applications. For example, one application may be e-mail. When a word is being typed, the system may look at the items in the solution set according to their probability of being typed with respect to the particular application. If the application is e-mail, the probability of "hello" may be very high, while if the application is a game, the probability of "left" and "right" may be very high. This is the application-specific occurrence probability. The system may then identify the most common word associated with each item in the solution set, and adjust the probability based on that information and the prior entered word. The system may also identify the second most common word associated with each entry, and adjust the probability given that the prior word was entered. This adjustment for concurrence data may be undertaken independently of what application is currently operating. The process may then continue in a like manner through the remaining relevant entries.

An exemplary organization of the dictionaries 21, 23 includes corresponding object lists 22, 24 that contain a number of objects, such as words, punctuation, or functions to be performed. The objects may be sorted in any appropriate manner. A second dictionary field includes corresponding identification lists 26, 28, which may comprise, for example, the keypad strokes that correspond to each particular object. The objects may be sorted according to their respective identifications to assist system 10 in more efficiently identifying the proper match to any given keystroke combination, since the system may follow the listing as each keystroke is added to a request. An exemplary tree-based structure for organizing the dictionaries is provided in more detail in reference to FIG. 8.

Referring again to FIG. 1, each dictionary entry may be provided with one or more occurrence or concurrence fields 30, 32, 34, 36, which may contain data representing the likelihood that a particular object will be the intended object when a user enters a number of ambiguous keystrokes. For example, an occurrence value may represent the relative popularity of a term in comparison to other terms. This relative popularity may be determined, for example, by scanning a group of relevant documents and determining the percent make-up of the documents by word. One or more of the concurrence values may comprise co-concurrence data that correlates terms with other terms that are often used with or near the first term.

For example, when a person types "I'll see you at" and 4663 into a telephone keypad, the entered number probably represents HOME, rather than GONE or HONE. The system 10 may store co-concurrence data to indicate that the term HOME is often seen near terms such as "at," "in," "around," "near," and "reach." That co-concurrence data may cause the term HOME to be promoted as a preferred solution over other possible solutions where corresponding co-concurrence terms have been entered, where HOME might not have been the top choice without having access to such context. System 10 may look both forward and backward in using co-concurrence data. For example, the system may select a particular term, and then revisit that selection after the user types in the next term, and perhaps then update the selected word. In short, the system may provide bi-directional co-concurrence checking.

One or more flag fields 38, 40 may also be provided for each entry, and may be used, for example, to indicate that a particular entry is a temporary entry. For example, the supplemental dictionary may receive time-sensitive information such as information about terms that are currently popular search terms. The information may be similar to that provided as part of the Google Zeitgeist. The flag may then represent an event upon which the information is set to expire. Another example of time-sensitive information includes entries based on the time of day. For example, search terms relating to restaurants may be emphasized during times when a user is likely to be hungry. The flag may indicate the information has expired once meal time has passed. Flags may also be used to indicate that a particular term is an adult term, so that it will only be shown if the user has selected to have adult query fill-ins. Also, a flag could indicate that a term is specific to a particular application. Other appropriate flags may also be provided and used.

Additional features may also be available in relation to the use of user-specific data entry information with system 10. For example, information associated with supplemental dictionary 23 may be replaced, deleted, or reset upon the occurrence of a particular event, such as the running of a predetermined time period, or the resetting of a device that implements system 10. As one example, up-to-date information about current search terms may be provided to the system 10, but may be set to expire after one or more days so that the system returns to its original state once the downloaded search information is presumably stale and unhelpful to the system 10. Also, information that updates the dictionaries during a particular search session may be reset when the session ends, such as when the device is turned off or reset.

The data may also be changed based on the time of day or a person's location. For example, search terms relating to restaurants may be emphasized during times when a user is likely to be hungry. Also, the global positioning system may be employed so that a user's data entry is targeted to the user's location. As one example, the system may recognize when a user is away from their home, and thus traveling, and may thus update the dictionary with information more relevant to a traveler, such as restaurant and airline information. In addition, the system may add to a user's standard dictionary information about locations that are proximate to the user, such as the names of nearby towns, streets, attractions, and buildings. For example, if a user is located in Alexandria, Va., the system may provide dictionary data to the device for terms such as Arlington, Wash., Capitol, Reagan-National, and Dulles.

Figure 2:
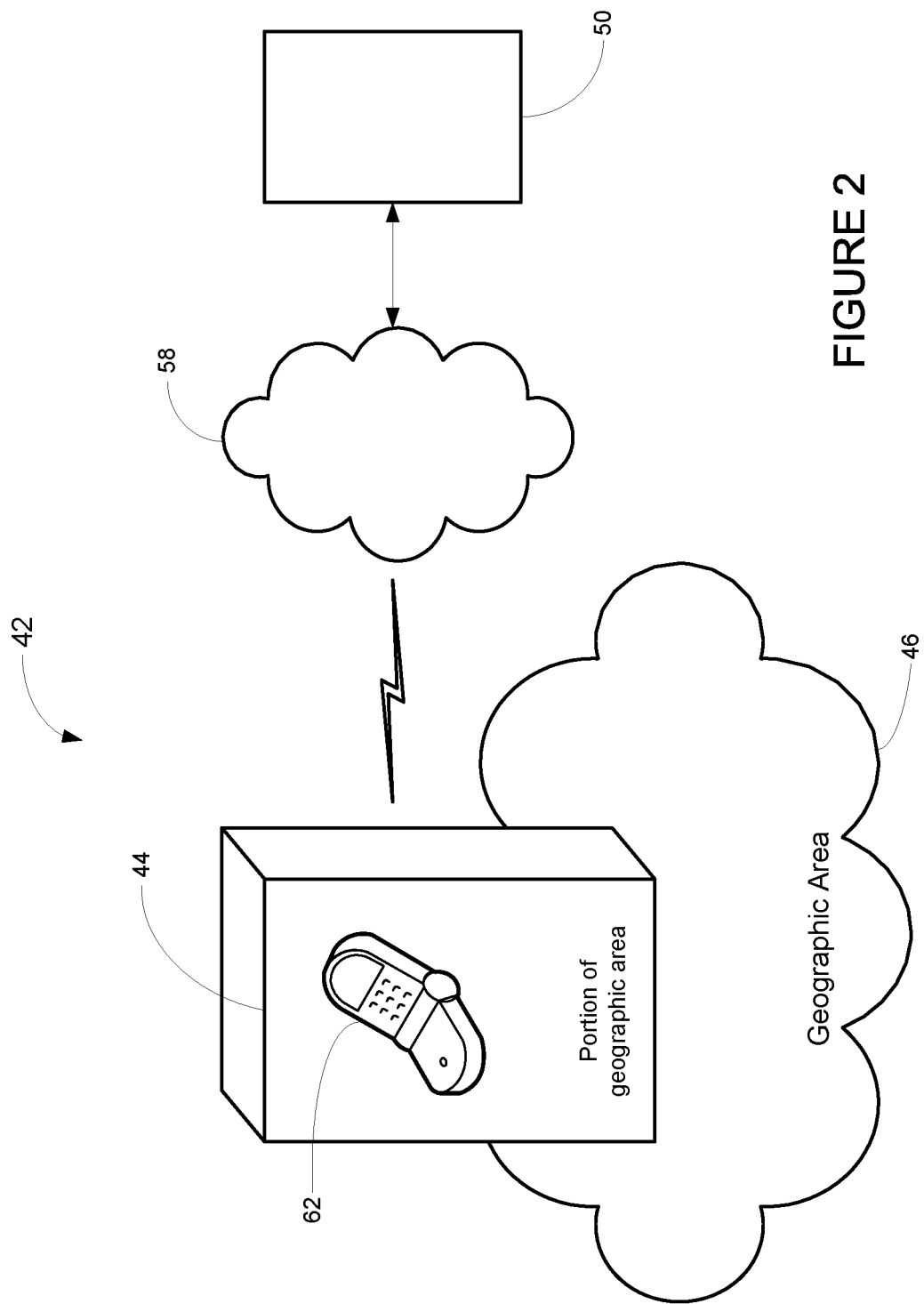
FIG. 2 is a schematic diagram of a system used for transmitting location data and returning information associated with the data for a data entry dictionary.

FIG. 2 is a schematic diagram of a system 42 used for transmitting location data and returning information associated with the location for a data entry dictionary 23. The user of a wireless communication device 62 may be located within a portion 44 of a larger geographic area 46. For example, the portion 44 could be defined as a house, a neighborhood, a city, a cellular or other transmission tower service area, a zip code, an area code, a state, a country or a continent. The geographic area 46 may simply be an area that is physically larger than the portion 44 and encompasses it.

The wireless communication device 62 may be communicatively connected to a network, such as the Internet 58, and thereby communicate with other devices such as the system 50. The device 62 may connect directly or indirectly to the Internet 58. For example, the device 62 may connect to a cellular telephone network that is, in turn, connected to the Internet 58, and it may also use technology such as Voice Over IP (VoIP). The communication flow for any device may be bidirectional so that system 50 may receive information, such as commands, from the devices, and may also send information to the devices.

A global positioning system (GPS) feature may be employed by the device 62 to transmit location data to the system 50 so that a user's data entry is targeted to the user's location. For example, if the device 62 is a cell phone that is GPS-enabled, the system 50 may query the phone to determine its current location. In one embodiment, the system's queries may be automatically generated to occur at a preset time. In other embodiments, the queries may be prompted by client software installed on the device 62 that monitors when the user moves from the portion 44 to another location, or the location data, as determined by the wireless device 62, may be sent with search terms if the user requests a search with the client software. Alternatively, the transmission of location data may be disabled by the user.

The user may also enter the location data using the device 62. For instance, the user could enter the location information for the user's residence or workplace. The data may be entered, for example, at the time the device 62 is purchased or at a time a client is installed on the device such as the Google client for mobile devices. Additionally, the user may update the location information when the user travels outside the portion 44 so as to reflect the user's current location, future location, or destination.

Alternatively, the location data may be obtained from a user's search requests. For example, if a user sends a request for directions to a particular address, the system 50 may extract the address from the query and use it to obtain the location data. If a user requests directions to a business but does not provide address information, the system 50 may obtain the address information for the business using a source such as a yellow pages database. The address information can then be used to calculated directions to the business as well as provide the location data used in augmenting the dictionary 23 in the device 62. Alternatively, the user may enter a business name as well as a partial address, such as a zip code. The zip code can be used to obtain the location data. If the business address can be determined, the location data may be supplemented with more specific information, such as the street name.

The location data received by the system 50 may be used to update the dictionary 23 on the device 62 with information relevant to the user's location. For example, if the user initiates a search request for hotels using the device 62, and the location data indicates that the person is in Palo Alto, Calif., the system 50 may return search results for the local Holiday Inn and the Radisson. Additionally, the dictionary 23 on the device 62 can be updated with the names of these hotels. With these terms preloaded into the dictionary 23, the user can type the terms with the assistance of predictive text entry or select them from a pull down list if the person wants to perform additional queries, such as read reviews on the local Holiday Inn and the Radisson. The names of the hotels are unlikely to be in either the main dictionary 21 or the supplemental dictionary 32 by default; therefore, without preloading the terms, the user would have to enter the terms by a slower method, such as triple tap. Additionally, if the Google client is installed, it may be augmented with the preloaded information instead of or in addition to the dictionary 23.

In another embodiment, the system 50 may also augment the dictionary 23 with the names of the towns that surround Palo Alto, such as Redwood City and Atherton. If the user is looking for hotels in Palo Alto, the person may decide to look for hotels in nearby towns as well. By preloading the dictionary 23 with the names of the surrounding towns and the names of the hotels in the surrounding towns, the user may type the terms faster by employing predictive text entry, or the terms may be selected from a menu presented to the user. The dictionary may also be preloaded with any surrounding areas, such as neighborhoods, zip codes, states, and countries, and is not limited to cities or towns.

The dictionary may also be preloaded with common queries related to the location data. For example, if the user is in Palo Alto, terms used in common queries about places located near the geographical location of Palo Alto, such as Stanford or the Elizabeth F. Gamble Gardens may be preloaded into the dictionary 23. Also terms used in common queries generated by other users located in Palo Alto may be preloaded. For instance, if Palo Alto users frequently submit search requests for second mortgage lenders, then terms from this query and its results may be preloaded into the dictionary 23. Location-related terms may also be used to pre-populate lists of locations in which the user may be interested, and the terms may be used for auto-completion of words as the user is entering data into device 62. The terms may also be used by a text entry program to perform spell-checks.

The terms may be loaded based upon a general location rather than a specific location, such as a particular town. For example, the locations can be as general as "home" or "traveling." When a user is "home," their standard dictionary is used. When the user is "traveling," travel-related terms may be loaded and/or elevated. Such terms may include names of hotel chains and restaurant types. In such a general situation, the location of the device may best be changed manually if the device does not have any automatic location-sensing features.

The location-related, preloaded terms may have a higher priority in the predictive text entry algorithms while the user is in the portion 44. As the user leaves the portion 44, the terms associated with this previous location may be assigned a lower priority. The terms may receive a rating based on how far the user is from the portion 44. For example, if the user moves from Palo Alto to Redwood City, the terms associated with Palo Alto may be reduced in priority by 33 percent, but if the user travels to San Francisco, which is farther from Palo Alto than Redwood City, the term's priority may be reduced by 90 percent. Concurrently, the terms associated with portions that the user travels toward may increase in priority. For instance, as the user travels towards San Francisco, the priority of terms related to this city may increase even as the priority of the Palo Alto-related terms decreases.

To save space in the dictionary 23 for relevant terms, a term may also be removed once the user travels a certain distance from the portion 44. This may include eliminating the location-related terms as soon as the user leaves the portion 44. Alternatively, the location-related terms may be eliminated by decreasing the term's priority relative to the distance traveled from portion 44 until the priority reaches zero, which may indicate that the term should be eliminated. In other embodiments, the term's priority may indicate its position on a drop-down list, where a higher priority may dictate that a term should be placed nearer the top of the list. A term with a lower priority would be closer to the bottom of the list. The terms may also be eliminated by an algorithm that takes into account their frequency of use, such as the Least Recently Used (LRU) algorithm. Using the LRU algorithm, for example, if the user frequently enters searches related to Palo Alto, but never to Redwood City, the terms related to Redwood City may be eliminated from the dictionary 23 even though it is a location near Palo Alto. This algorithm may also keep the Palo Alto-related terms even if a user travels far from this location, if the person continues to search for terms related to Palo Alto.

The device 62 may also store the user's preferences, which may determine what location-related information is used to update the dictionary 23. The preferences may be stored by the client installed on the device, or by other software or hardware components. The preferences may include likes or dislikes of a user, such as that the person likes Japanese food, but not Thai food. If the user was located in Palo Alto and entered a search for restaurants, the device 62 can transmit the preference information with the search. The system 50 may then supplement the dictionary 23 with the names of local Japanese restaurants, but not local Thai restaurants. In another embodiment, if the user entered a search for Japanese restaurants, the dictionary 23 may be supplemented with the names of other local Asian restaurants, such as Vietnamese and Chinese Restaurants, but exclude Thai restaurants.

The user's preferences may include a generic profile that is used to determine which location-related terms may be added to the dictionary 23. The profile may contain preferences that are typically associated with members of a particular group. The group may be limited to people with certain attributes including occupation, income level, and age. For example, the generic profile for a teenager may indicate that the person likes pizza, but does not like expensive restaurants. When the user searches for restaurants, the system 50 may use the location information and the submitted search terms to reference a source that rates local restaurants by cost. The dictionary 23 may be supplemented with the names of local pizza restaurants, but exclude the pizza restaurants that are rated as expensive. In some embodiments, the generic profile may be supplemented or modified to more accurately reflect a user's preferences or attributes.

In addition, information may be adjusted according to a "decay rate." For example, a term's probabilities can be decreased with each time period in which the word is not used. The decay may be based on usage rather than time or location, i.e., each time a word is used, the probabilities of all other words are reduced. The words will then be removed when their probability falls below a threshold level. For example, after some period of typing other words, it will become apparent that the device does not receive the word "lavender" very much, and that word can be removed from the dictionary.

The dictionary 21 and supplemental dictionary 23 need not take any particular form. Rather, the dictionary may be any appropriate structure that stores data for completing or correcting data entry, in whatever form, and for providing the ability to assist in selecting appropriate data. Moreover, the dictionaries may be combined or further divided, may have various data types and forms, and may represent objects other than mere words.

Specifically, each item of dictionary data may take many forms. For example, an item may be a word or phrase. It may also be a word root, so that the system can build words from simpler component parts. In addition, an item could be a number, a piece of punctuation, or another symbol. An item could also comprise an image, sound, or other such object. In addition, the item may represent a function to be carried out by the system, whether predefined and associated with particular code, or defined as a macro by a user. Thus, the use of the terms "word" and "term" above are intended to be exemplary, and not limiting in any manner.

Organizationally, the information may be stored on a computer as an ordered list of "related" terms for each term. For example, a server could store words that occur frequently in the same document, words that occur frequently in the same session, or other groups. This ordered list can be returned by a server to a device, along with the probability of co-concurrence (or relative probability of co-concurrence). For example, for the word "mustang," "Ford" may have a probability of 0.10 and "horse" a probability of 0.15.

Figure 3:
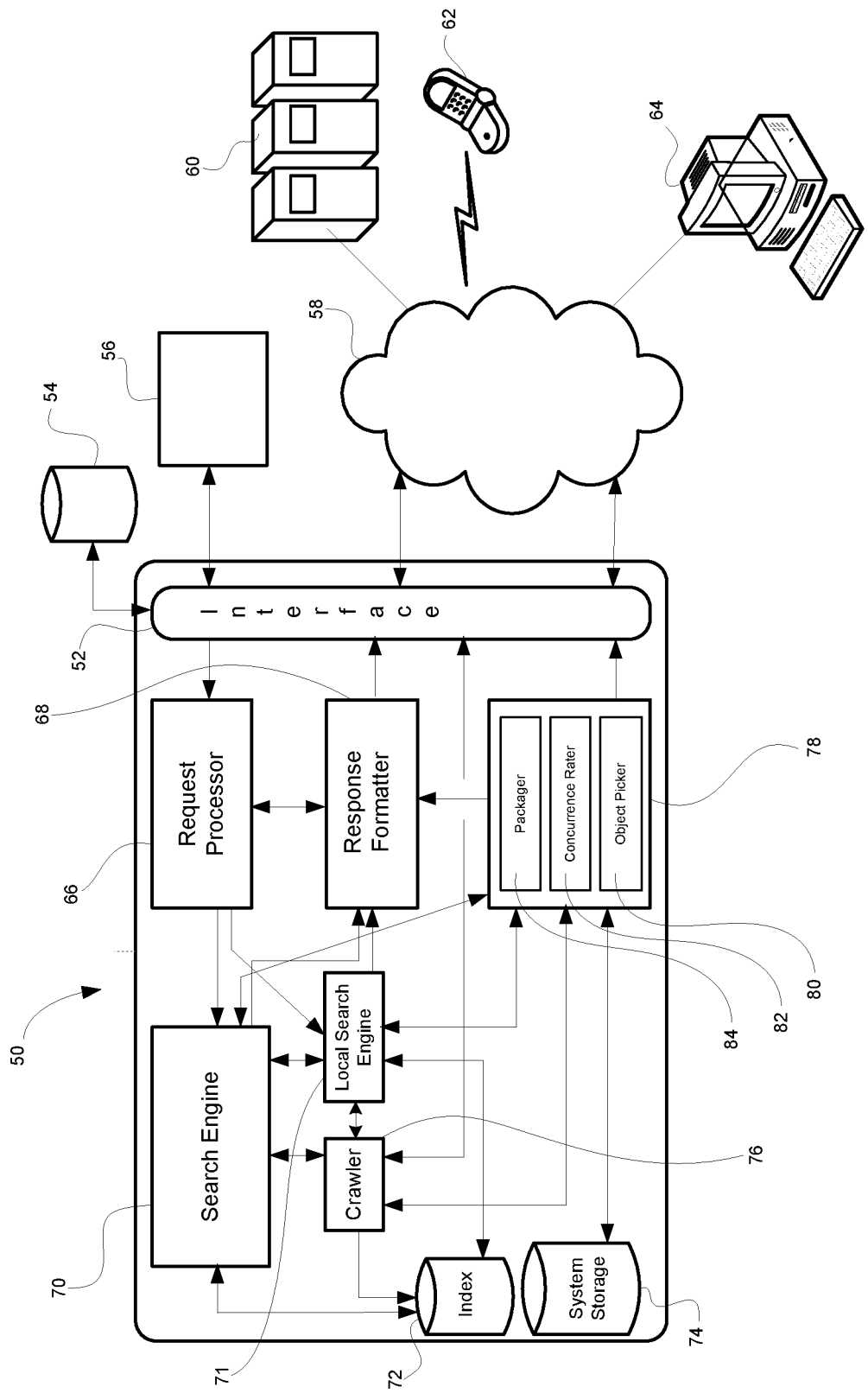
FIG. 3 is a schematic diagram of a system to identify, format, and distribute information for a data entry dictionary.

FIG. 3 is a schematic diagram of the system 50 to identify, format, and distribute information for a data entry dictionary The system 50 may be implemented, for example, as part of an Internet search provider's general system. System 50 is generally equipped to obtain information about the occurrence and concurrence of terms from various sources, and to generate dictionary information based upon an analysis of word use in such sources. Such sources could include, for example, data stores of information at a particular organization, data for an individual (such as outgoing messages stored in a Sent Items box), or data about search terms entered recently by users of an Internet search service.

System 50 is provided with an interface 52 to allow communications in a variety of ways. For example, system 50 may communicate with database 54 external to system 50, such as via a LAN, WAN, or other appropriate communication means. System 50 may also communicate with server 56, which may provide access to various applications required by system 50. In addition, system 50 may be communicatively connected to a network such as the Internet 58, and thereby communicate with various devices such as server farm 60, wireless communication device 62, and personal computer 64. The communication flow for any device may be bidirectional so that system 50 may receive information, such as commands, from the devices, and may also send information to the devices.

Commands, location data, and requests received from devices may be provided to request processor 66, which may interpret a request, associate it with predefined acceptable requests, and pass it on, such as in the form of a command to another component of system 50 to perform a particular action. For example, where the request includes a search request, the request processor 66 may cause search engine 70 to generate search results corresponding to the search request. Such a search engine 70 may use data retrieval and search techniques like those used by the Google PageRank™ system. The results generated by search engine 70 may then be provided back to the original requester using response formatter 68, which carries out necessary formatting on the results.

Additionally, the requests received by the processor 66 may include location data that is passed along with the search request to a local search engine 71. The local search engine may use search techniques to return results to the user that are associated with the user's location. Alternatively, the results produced by the engine 71 may not be provided back to the original requestor as search results. Instead, the user may receive search results that are not necessarily associated with the person's location, however, the location-related results can be used to augment the dictionary on the requesting device. Additionally, the location data may be received by the processor 66 independent of a request. The location data may be used by the local search engine 71 to generate results including common requests for that location and the names of surrounding locations. These results may then be used to pre-load the dictionary 23 with location-related terms that the user might wish to enter into the device 62.

The local search engine 71 may work in concert with or independent of search engine 70. Search engine 70 may transmit requests to local search engine 71, and engine 71 may return the results to engine 70 for additional processing. Alternatively, local search engine 71 may receive the requests and location data directly from processor 66 and provide the results to the original requestor using the response formatter 68. In some embodiments, the local search engine 71 may be implemented as a function within the search engine 70.

Search engine 70 and local search engine 71 may rely on a number of other components for their proper operation. For example, search engine 70 may refer to an index 72 of web sites instead of searching the web sites themselves each time a request is made, so as to make the searching much more efficient. The index may be populated using information collected and formatted by web crawler 76, which may continuously scan potential information sources for changing information. In additional to the index 72, the local search engine 71 may rely on a database that contains address or location information, such as a yellow pages database. The database may be implemented at the storage system 74, the database 54, the server farm 60, or other locations not shown. Engine 71 may use the address information in the database to determine the location associated with possible results generated by a request. The engine 71 may then return the results that are associated with a location close to the user.

In addition to the search results, the system 50 may provide to users updated dictionary information, which may include user-specific information, with dictionary generator 78. Dictionary generator 78 generally operates by extracting relevant concurrence data or information (including the occurrences of certain terms, concurrence of terms with other terms, and co-concurrence (n-gram) data) from accessed data stores, generating occurrence parameters for the information, and organizing the information in a manner that can be transmitted for later implementation by a user, including a remote user, such as a user of a personal communication device.

The information on which dictionary generator 78 operates may be general, such as all search terms entered recently on a search engine, or may be specific, such as search terms entered by members of a particular group. The system 50 may receive identifying information from a user, and may use that information to determine a group to which the user belongs so as to give the user the most relevant dictionary information. For example, engineers, dentists, or attorneys may self-identify themselves as falling into their particular groups, and may then receive data relevant to that group. In this manner, the dictionary data may be particularly relevant to members of the group. The system 50 can also receive location data from the user, and may use that information to provide the dictionary with entries that are closely related to the user's current location.

Dictionary generator 78 may be implemented using any appropriate components. As shown, it comprises an object picker 80, or object selector, a concurrence rater 82, and a packager 84. The object picker 80 or object selector is a module that is capable of parsing or otherwise analyzing an information store so as to determine how data is used or organized in the information store. For example, the object picker may identify each unique word in a particular document or group of documents. The object picker may review the documents directly or may act in concert with data gathered by web crawler 76 and stored in index 72 or with results produced by search engine 70 or local search engine 71.

Concurrence rater 82 provides a determination of the likelihood of appearance of particular terms or other objects in the document. For example, concurrence rater 82 may provide a normalized number establishing the amount of use of a term compared to other terms (i.e., the term's normalized occurrence). Concurrence rater 82 may also establish such use information as between or among certain words or phrases, or parts of words so as to provide for concurrence and co-concurrence information.

Packager 84 places the dictionary information in a form in which it can be accessed and used easily. For example, packager 84 may compress or encrypt the information, and may also encode it in a manner that can be read by a device such as a personal communication device.

The dictionary generator 78 components may also be implemented in a "layered" structure (similar in manner to the ISO/OSI structure) or object-oriented structure to provider greater modularity. For example, multiple different packagers 84 may be implemented to produce transmittable dictionary data for various types of devices, and may all communicate with the concurrence rater 82 in a common manner. Also, multiple concurrence raters could be provided, for example, to provide different types or levels of concurrence data. In addition, different object pickers may be used, for example, to access text files, sound files, or other materials.

In such a layered structure, each component need only be concerned with its interface to the next adjacent component, and need not be concerned about the internal operation of the next component, or with any operation of components in more distant layers. In such a manner, the items may be implemented in a more modular fashion to increase the coding efficiency of the system and to minimize errors.

The dictionary generator 78 may also access system storage 74 as necessary. System storage 74 may be one or more storage locations for files needed to operate the system, such as applications, maintenance routines, management and reporting software, and the like.

In one application, system 50 could be programmed to access documents containing information relevant to a particular user or users. One or more groups of information, such as the pages of an Internet site, or various data stores held within an organization, may be scanned, such as by providing the system 50 with one or more uniform resource locators (URLs). The system 50 may determine the occurrence, concurrence, and co-concurrence of certain terms, and may assign concurrence parameters to them. The system 50 may also identify particular terms having high occurrence rates relative to their occurrence rates in ordinary parlance, so as to indicate that those terms are special to the organization. Such terms may include, for example, the name of the organization and its affiliates, and may also refer to particular acronyms used by the organization. For example, an organization may have a corporate-wide nostalgic reference to e-mails as "wires," so that the organization's internal communications use the term "wire" much more often than it is used in normal parlance. A scan of the organization's documents (e.g., e-mails or other documents) would turn up this special usage and give the term "wire" a high occurrence rating.

This feature allows for a service by which organizations such as corporations or parts of corporations, can contract with service providers, such as telecommunications providers, to supply communication devices to employees of the corporation. The telecommunication provider, or its agent such as a search company, could scan the corporation's documents, and could thereby generate a custom dictionary specific to the organization, that can be loaded onto each communication device distributed under the contract. The device may also send information to a central system that identifies the user as a member of the organization so that updated dictionary information relevant to the organization may be passed to the user's device.

Figure 4:
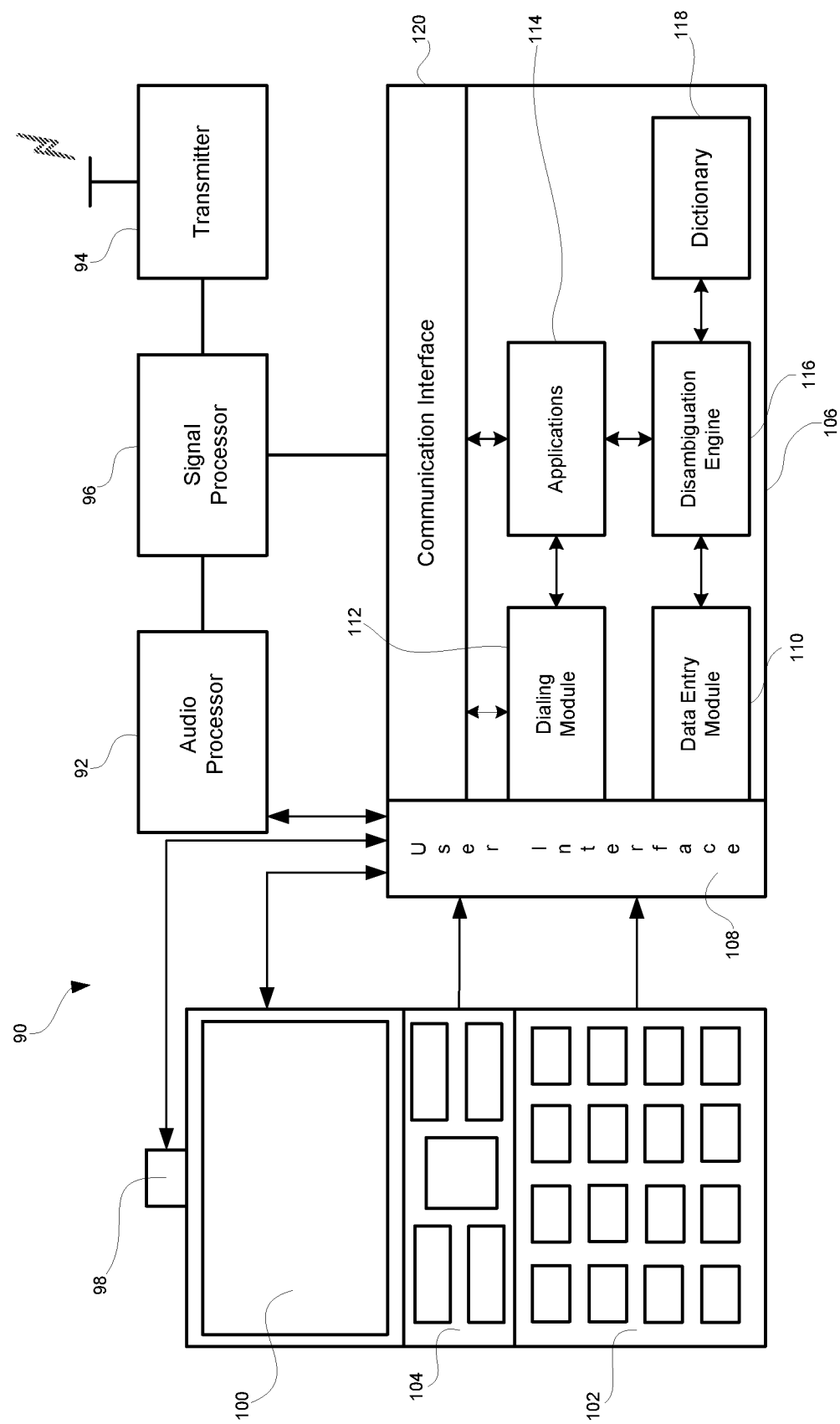
FIG. 4 is a schematic diagram of a system for receiving and using a user-specific data entry dictionary.

FIG. 4 is a schematic diagram of a system 90 for receiving and using a user-specific data entry dictionary. The system 90 may be implemented in a device such as a personal communicator, e.g., a cellular telephone. The system 90 receives and transmits information wirelessly using transmitter 94, with the received signals being passed to signal processor 96, which may comprise digital signal processor (DSP) circuitry and the like. Normal voice communication is routed to or from audio processor 92, which may communicate with speaker/microphone 98, including via user interface 108.

User interface 108 handles all communication with the user of the system 90, including voice, visual, and data entry communication. Visual presentation of information may be provided via display screen 100. General data entry, apart from entered voice data, may occur through keypad 102, which may be arranged as a standard 12-key telephone keypad. The device may also be provided with appropriate control keys 104 for performing necessary control functions. Key pad 102 and control keys 104 may include contact push-buttons, joysticks, portions of touch-sensitive panels, or other appropriate input devices. Although the communication is shown for clarity as occurring through a single user interface 108, multiple interfaces may be used, and may be combined with other components as necessary.

The system 90 may be provided with a number of computer applications 114, such as games, applications to assist in dialing numbers, and applications to permit web browsing, including the entry of data as part of the web browsing. The applications may be stored in ROM, Flash memory, RAM, MRAM, or otherwise, as appropriate, and may be accessed by the system 90 as needed. A dialing module 112 may provide standard dialing functionality for the system, receiving entered dialing digits or voice dialing instructions through interface 108, and providing appropriate dialing signals through transmitter 94 using communication interface 120.

A data entry module 110 receives data other than dialing instructions, such as search data entered into the system 90. The data entry module may provide the entered data directly to an application, or may employ disambiguation engine 116 to help translate the entered data. The disambiguation engine 116 may analyze entered information that would be reasonably interpreted as having multiple possible meanings, and may apply rules to information to determine or help determine what the user actually intended to enter.

In determining what was intended to be entered, disambiguation engine 116 may rely on dictionary 118, which may generate information about probable or common usage of words or other forms of data, or may be provided with such information, such as from a remote site through transmitter 94.

Although shown in an implementation in a personal communicator, system 90 may take many other forms. For example, system 90 could be implemented as part of a personal computer, whether networked or unnetworked, and if networked, whether by wire or wirelessly. Also, data entry may occur in different manners, including by complete keyboard, constrained keyboard, or voice command. Also, one or more components may be located remotely from the system 90, such as at a remote server, and the functionality of system 90 may be provided by combining the components or using components other than those shown.

Figure 5:
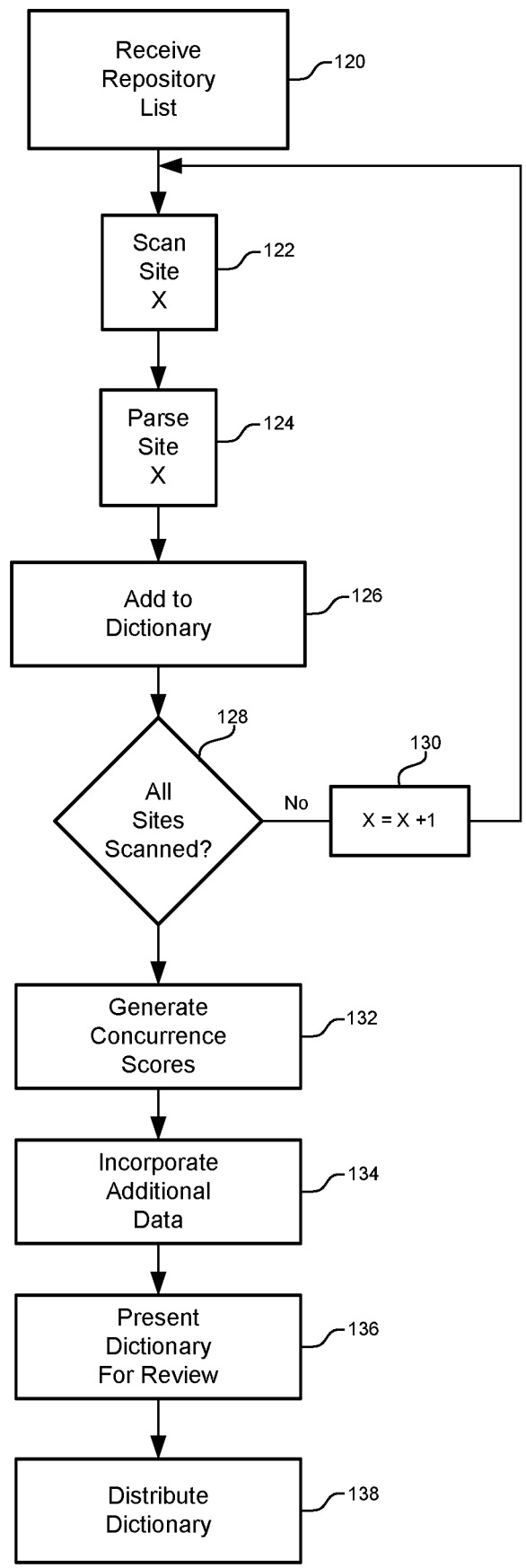
FIG. 5 is a flow chart showing exemplary steps for preparing information for a data entry dictionary.

FIG. 5 is a flow chart showing exemplary steps for preparing information for a data entry dictionary. In general, the chart shows an implementation in which a system prepares a dictionary or dictionary supplement that is user-specific, e.g., containing information about the user, about a group of which the user is a member, or otherwise reflecting probable usage of terms by a user. At step 120, a repository list is received. The repository list may include a list of files or locations that contain information to be analyzed, and may include directions to a user's e-mail account or to particular data stores containing documents to be scanned. For example, the repository list may include the location of a user's e-mail account or out box, or locations at which files are stored for an organization. At step 122, the first site is scanned for information, and the information is parsed at step 124. For example, each unique word at the site may be identified, and the absolute or relative number of occurrences of the word may also be tracked. At step 126, new terms identified at the site are added to a dictionary.

At step 128, a determination is made regarding whether all identified sites have been scanned. If they have not, a parameter tracking the list of sites to be scanned is incremented at step 130, and another site is then scanned at step 122. If all the sites have been scanned, occurrence and concurrence scores or parameters for various terms may be generated at step 132.

As a relatively simple example, the total number of words in all the scanned documents may be computed, and the number of times each identified unique word appears may be divided into the total to create a normalized occurrence number for each word. Co-concurrence (n-gram) scores may also be generated between and among words. The type of each scanned document may also be tracked so that application-specific concurrence data may be generated. For example, concurrence data for e-mail communications may differ from that for more formal documents such as word processing documents, or less formal documents such as instant messaging. The concurrence data may be divided out according to scanned application, and the relevant data may then be accessed when a user is employing the corresponding application.

The system may allow additional data to be incorporated into the dictionary at step 134. For example, if a dictionary is being established for a large organization, the organization may specify that certain terms are to be included in the dictionary, and may also specify terms that are to have scores higher than the document analysis would otherwise indicate. The system may also present the dictionary for review 136, if such review is desired, before distributing the dictionary at step 138. The distribution may occur, for example, upon the commissioning of particular devices, or may occur by making the dictionary data available for automatic or manual download. Distribution may occur at the time of handset creation, at the point of sale (after a user self-identifies as being part of a group) or even over the air at a later date. Dictionary updates may also occur at any relevant time.

In one implementation, the data store to be scanned may be a user's e-mail out box. The documents in the out box likely represent words and phrases that the user prefers to employ, and thus likely will be good predictors for later data entry by the user. Also, the out box will commonly be populated with information not typically in a dictionary, such as common names, and e-mail addresses to which the user commonly sends messages and web-sites commonly used.

Figure 6:
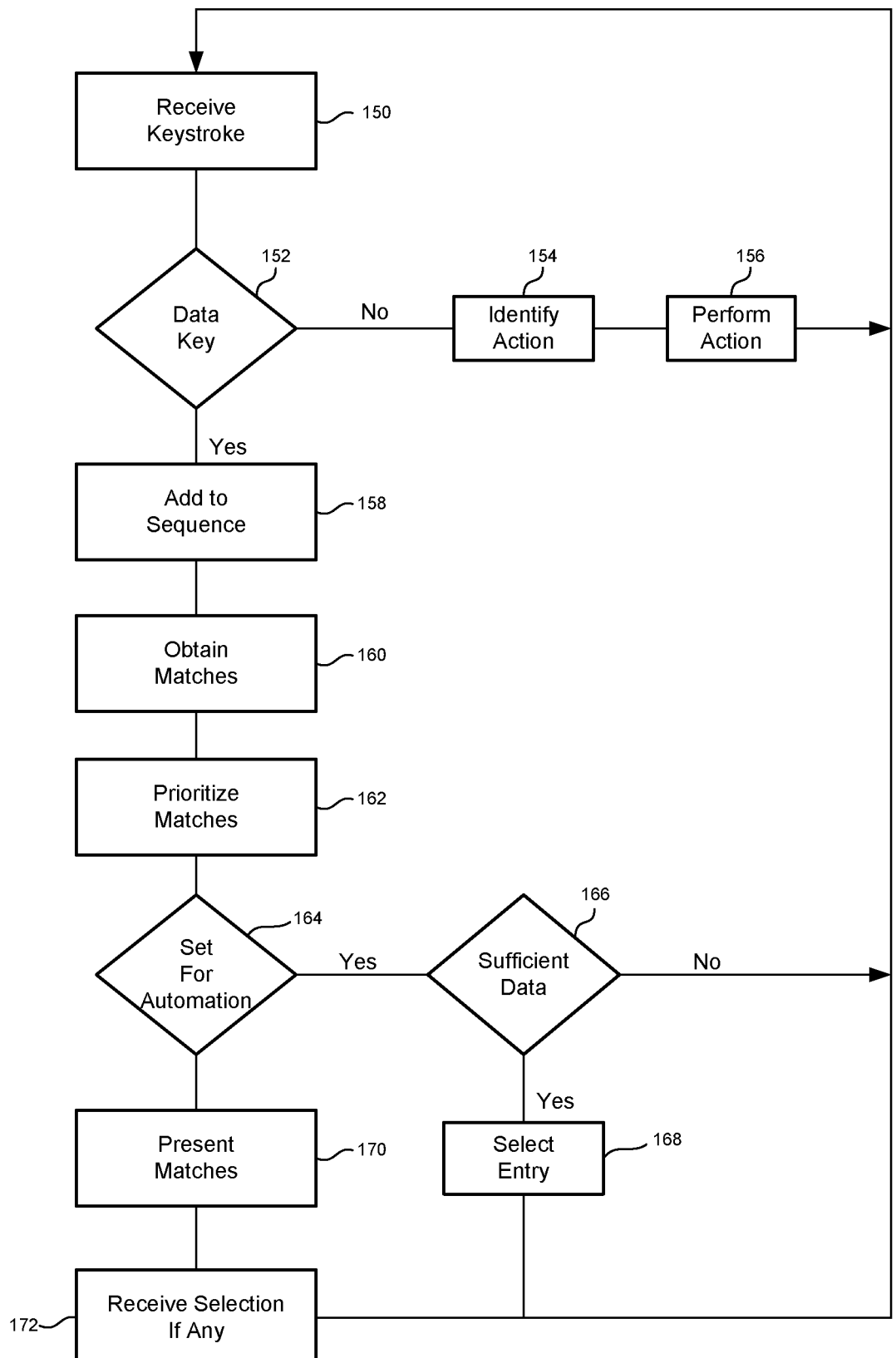
FIG. 6 is a flow chart showing exemplary steps for disambiguating information entered into a device.

FIG. 6 is a flow chart showing exemplary steps for disambiguating information entered into a device. At step 150, a keystroke or other ambiguous data entry is received. Step 152 determines whether the keystroke represents a data key 152. If it does not, it represents some action to be performed, so the action is identified 154, and the system performs the action 156. For example, the keystroke may represent the submission of data that has been entered, or could represent a request to turn off the device.

If the keystroke represents entered data, the keystroke is added to a buffered sequence of keystrokes 158. The system may then use the sequence of keystrokes to determined the likely intent of the user in entering the keystrokes. In particular, the system may obtain possible data matches for the keystrokes 160 in the form of a solution set, which may be displayed as a list of possible matches for the keystroke, as explained more fully with respect to FIG. 8 below. The system may also prioritize the matches 162, such as by using concurrence data (e.g., occurrence data, concurrence data, or co-concurrence data).

If the system is set to resolve ambiguities automatically 164, the system may then determine whether sufficient data has been received to make a selection automatically. For example, if there is only one match in a dictionary for the entered keystrokes, the selection could easily be made by the system. Also, rules may be established for making matches even when there is some ambiguity, such as when the score for the second-best-match is below a certain value, or the difference between the best and second-best scores exceeds a certain threshold.

The user may also be given an option to specify how "loose" or "tight" the system will react before selecting matches automatically, so as to allow control over the number of erroneous selections (i.e., by specifying "tight" operation). If the system has sufficient data to make a selection 166, it selects the appropriate entry 168. If it does not, it waits for the next keystroke. As one example, in a search application, the system may be established for an "I'm Feeling Doubly Lucky" mode. In such a mode, the system can select a word or phrase automatically when selection rules indicate an adequately high confidence that the selection is accurate, and may then automatically submit the word or phrase as a search request and direct the user to the information at the first matching search result (which is a traditional "I'm Feeling Lucky" step).

If the system is not set to resolve ambiguities automatically, it may present possible matches to the user 170 for the user to select the desired match 172. The matches may be sorted according to the concurrence information stored in a system dictionary, or in another appropriate manner. If the user does not make a selection, the system waits for another keystroke. The user may also provide an end-of-entry indication, such as by entering a "1" on a telephone keypad, by pressing a control key, or by pressing the key designated as the space bar ("#") or a variety of other mechanisms, so as to force a selection.

The system may also determine the mode in which a user is entering information. In particular, when a cellular phone user enters keystrokes, the user could be dialing a number, using one-tap data entry requiring disambiguation, or using multiple-tap entry (e.g., if the user is entering a term such as a proper name, that they know will not be in their dictionary). The system may then simultaneously identify and present matches for each of these possibilities.

If the sequence of key presses does not match any predefined term (i.e., this is a new word), words may be added "on-the-fly." In such a situation, when the device determines that a word has been entered, but that there is no possible match, the device may provide a cue, such as by flashing the screen or beeping a particular tone or speaking a term or phrase. The user may then be given the opportunity to complete the word using standard, slower typing mechanisms (e.g., triple tap). When the word is complete by the alternative input method, it may be added automatically to the dictionary. At that time, it may also be assigned a probability, which would generally be a high probability because if the word was just used, it is likely to be used again.

Also, a user may be allowed to enter a predetermined key sequence to add a term in this manner before attempting to enter it using the disambiguating system. For example, if a user intends to enter another person's complicated, and uncommon name, they could provide an appropriate indication so as to start triple tap entry immediately. The user may also be provided with other manners in which to indicate an intent to enter information by a more primitive method.

Also, where matches do not exist or the concurrence data is sufficiently bad for the terms that do match, the system may seek out additional information. Specifically, the device may make a request from a remote server, and obtain possible matches with their appropriate concurrence data. The received information may also be used to update the device's dictionary. Where the connection between the remote device and the main system has sufficient speed, remotely stored dictionary information can be transferred more often, including for each keystroke.

Figure 7:
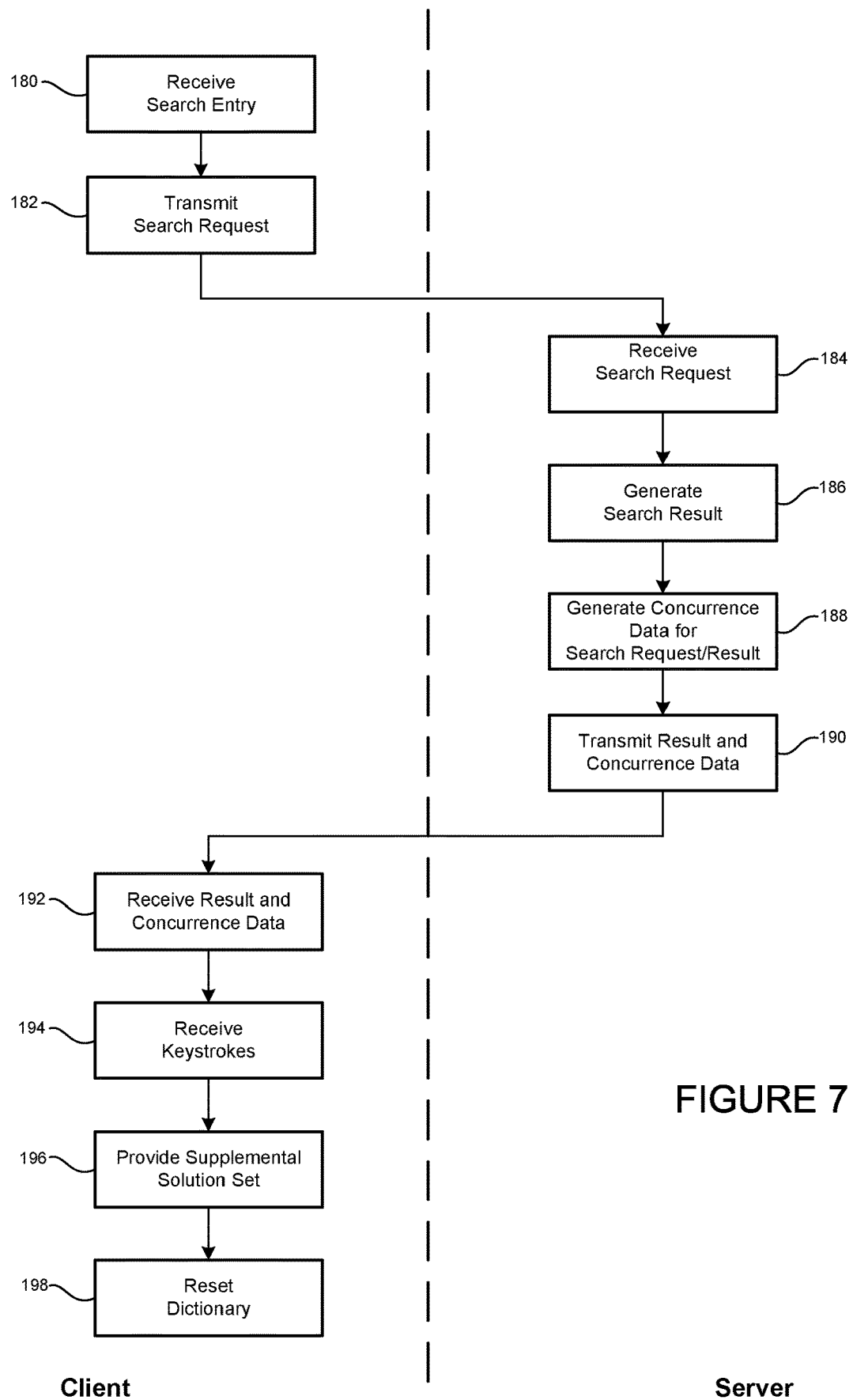
FIG. 7 is a flow chart of exemplary steps providing data entry dictionary information in response to a request from a remote device.

FIG. 7 is a flow chart of exemplary steps providing data entry dictionary information in response to a request from a remote device. The flow chart is divided to indicate steps carried out by a server and those carried out by a client. As shown, the server may be any apparatus or system that is established to receive requests from users and provide responses, while the client may be any appropriate device or collection of elements operated by a user. In other words, the relationship is not limited to a formal client-server relationship.

At step 180, the client receives a search entry from a user, such as terms to search with a search engine. The client then transmits the entry as a search request 182, and the server receives the request 184. The server may generate a search result or results 186 by any appropriate means, including by many well-known search techniques.

The server may generate concurrence data 188, including data corresponding to the search request and results. The concurrence data may include other terms entered by other searchers who have used the particular search term in the past or in the recent past. For example, if the search term is "comics," the concurrence data may include terms such as "Dilbert," "Blondie," "Beavis," "Bart," "cartoons," and "animation." The concurrence data may also relate to data at the locations identified in the search results. For example, if the search term is "Abraham Lincoln" and one of the search results is the Gettysburg Address, the concurrence information may include the phrase "four score" from that document. In this manner, the system may be prepared when a user opens the search result and wonders what "four score" means, and the user then starts to enter that phrase as a subsequent search term. The system could then complete the user's text entry more readily than it would without such user-specific information.

When the search result and concurrence data are assembled, the server may transmit them to the client 190, 192. The client may then integrate the concurrence data into its existing dictionary, to be used when it receives subsequent keystrokes 194. With the additional information, the matches to the user's entered keystrokes may be represented by a supplemental solution set 196. The supplemental solution set represents possible matches for the pressed keystrokes, as supplemented by the data from the server, and may also include the updated concurrence data from the server.

To prevent the dictionary from becoming overly large, and because information about a requested search may become out-of-date as soon as the user moves onto a new search topic, the system may reset the dictionary 198 upon the occurrence of an event, such as the running of a time interval or the resetting of the device. Also, if the dictionary reaches or approaches capacity, terms such as the present lowest probability terms may be removed, either singularly or in groups.

In another embodiment, the remote device may be constantly transmitting data about entered keystrokes as the user enters them, i.e., when there is a fast connection between the client device and the server. As the user types, the server may be looking at related words, and may be providing constant updates to the dictionary, including a dictionary at the server site. Information may also be requested frequently, apart from the entry of searches by a user, such as by pinging a server for updated information. In this way, a device can periodically download updated dictionary information.

Figure 8:
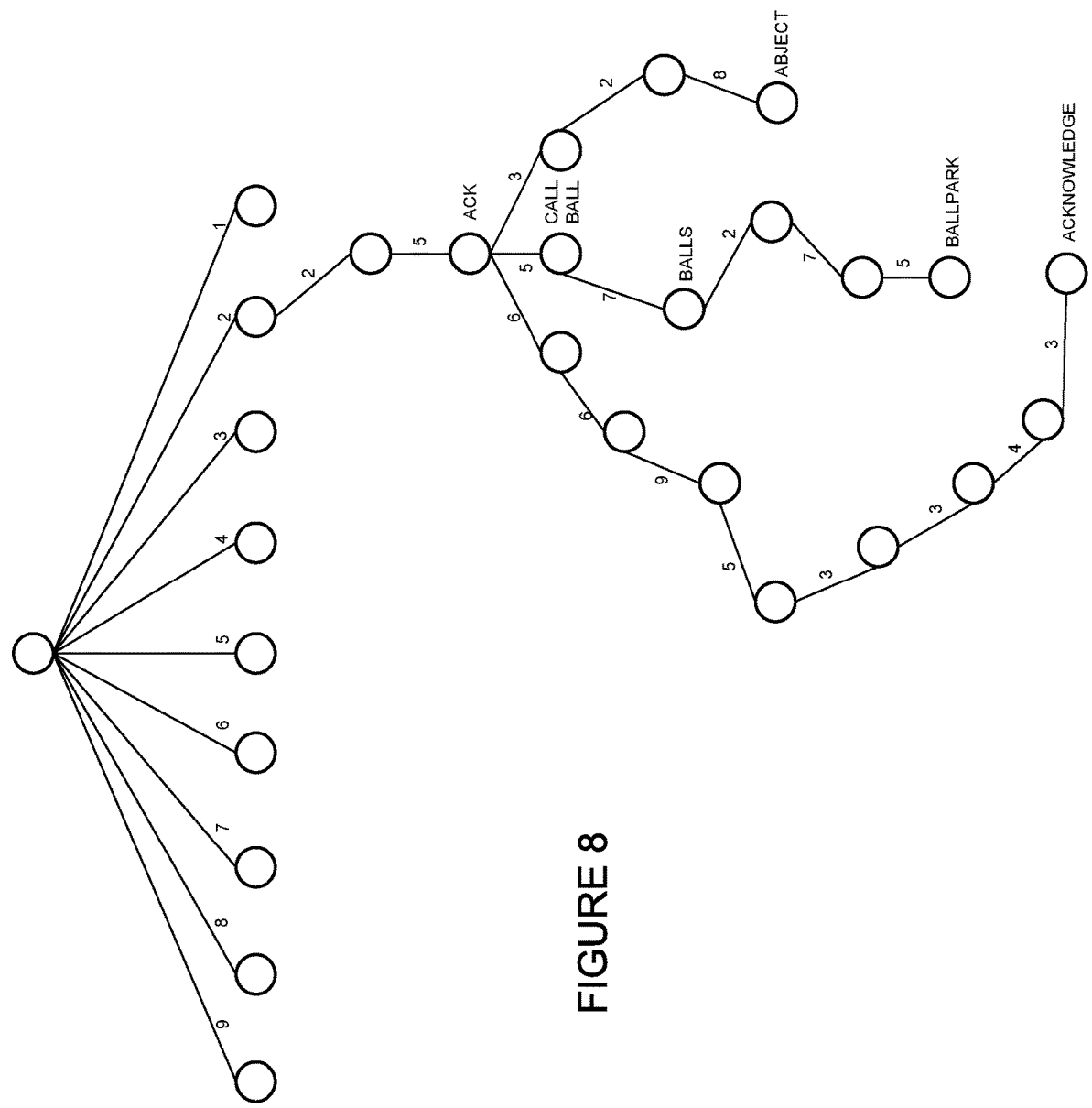
FIG. 8 is a schematic diagram showing the logical tree-based organization of a data entry dictionary.

FIG. 8 is a schematic diagram showing the logical tree-based organization of a data entry dictionary. Each node of the tree is represented by a circle, and represents a state that occurs upon the entry of a numerical keystroke on a conventionally-printed telephone keypad. The '1' has no letters on it, and can be used for purposes such as punctuation entry, or delineating the end of a particular data entry (like a space bar or an 'enter' key). Each single keystroke represents the entry of a single character for the user, but ambiguously represents three possible characters for the system (four possible characters for the "7" and "9" keys).

For example, the keystrokes 225 represent to the system the following: [A or B or C] and [A or B or C] and [J or K or L]. This sequence could represent the word "ACK" uttered by Bill the Cat, or could represent the beginning of other terms such as BALL, CALL, ABJECT, or ACKNOWLEDGE, among many others. If a user then enters the '3' key, the size of the solution set shrinks dramatically, so that only words having D, E, or F as their fourth character can be proper solutions—in the example, only ABJECT. In this manner, the entry of each additional character "prunes" the tree and leads the system closer to a small enough solution set that a selection can be made with a reasonable expectation that it will be accurate.

Keystrokes may also be interpreted in a pair-wise manner or other appropriate manner. Specifically, a particular letter or character may be identified for each pair of keystrokes so as to allow for entering of certain data using traditional multi-key entry techniques. Characters identified in this manner may also be combined to create ambiguous combinations for presentation to the system. For example, if a telephone user presses 226393, the user could be attempting to enter 'BOY' using a multi-key entry technique. The person could also be using a single key technique to enter the following: [A or B or C] and [A or B or C] and [M or N or O] and [D or E or F] and [W or X or Y or Z] and [D or E or F]. The system may resolve both ambiguities, and present the results together for further resolution or completion.

The features just described for text entry may also be applied to systems that obtain data using voice recognition or other means, such as video recognition. The translation of input from a format such as voice may occur by any of a number of well-known means used to incorporate voice recognition with other data entry technologies. For example, sensed voice commands may be translated into a format such as VoiceXML or other usable format. Also, the system may operate on data entered in various different languages.

Other methods for providing input may also be used as appropriate. For example, the device may be provided with an accelerometer that may provide input. For example, the user may jerk the device to indicate that a term has been entered. Also, the user may selected items, such as from a list, by tilting the device forward or backward.

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few embodiments have been described in detail above, other modifications are possible. Portions of this disclosure discuss operation though portable devices with constrained keyboards, but any of a number of devices may be assisted, including fully-functional computers with full keyboards. Also, the logic flows depicted in the figures do not require the particular order shown, or sequential order, to achieve desirable results. Also, other steps may be provided, or steps may be eliminated, from the described flows, and other components may be added to, or removed from, the described systems. Other embodiments may be within the scope of the following claims.

What is claimed is:

1. A device comprising:
   a memory comprising a data entry dictionary that maintains concurrence probabilities for words in the data entry dictionary; and
   at least one processor configured to:
      receive a plurality of user inputs that each correspond to a respective location of a keyboard;
      determine, based on the plurality of user inputs, at least one first word from the data entry dictionary;
      automatically receive updated dictionary information for a particular geographic location that is associated with the at least one first word;
      add, to the data entry dictionary and from the updated dictionary information, at least one second word that is associated with the particular geographic location;
      update, based on the updated dictionary information, the concurrence probabilities for words in the data entry dictionary;
      output, for display, the at least one first word; and
      output, for display and based at least in part on a respective concurrence probability of the at least one second word relative to the at least one first word, the at least one second word as a likely candidate for a follow-up word.

2. The device of claim 1, wherein the at least one processor is configured to update the concurrence probabilities for words in the data entry dictionary by increasing a respective concurrence probability of the at least one first word relative to the at least one second word.

3. The device of claim 1, wherein the at least one processor is further configured to output the at least one second word as the likely candidate term further in response to determining that the respective concurrence probability of the at least one second word relative to the at least one first word exceeds a respective concurrence probability of other words from the data entry dictionary relative to the at least one first word.

4. The device of claim 1, wherein the at least one processor is further configured to update the concurrence probabilities for words in the data entry dictionary by decreasing respective probabilities, relative to the at least one first word, of other words from the data entry dictionary that are not associated with the particular geographic location.

5. The device of claim 1, wherein the at least one first word is different than the at least one second word.

6. The device of claim 1, wherein the at least one processor is further configured to automatically receive updated dictionary information for a particular geographic location that is associated with the at least one first word in response to outputting location information indicative of the particular geographic location associated with the at least one first word, the location information being obtained from a positioning system that indicates the device is at the particular geographic location.

7. The device of claim 1, wherein the device is a client device and the at least one processor is configured to automatically receive the updated dictionary information from a server device.

8. The device of claim 7, wherein the at least one processor is configured to automatically receive the updated dictionary information from the server device in response to outputting, to the server device, location information indicative of the particular geographic location associated with the at least one first word, the location information being obtained from a positioning system that indicates the device is at the particular geographic location.

9. The device of claim 7, wherein the at least one processor is configured to automatically receive the updated dictionary information from the server device while the at least one processor receives additional user inputs that each correspond to a respective location of the keyboard.

10. The device of claim 7, wherein the at least one processor is configured to automatically receive the updated dictionary information from the server device periodically and apart from receiving additional user inputs that each correspond to a respective location of the keyboard.

11. A method comprising:
   receiving, by a computing device, a plurality of user inputs that each correspond to a respective location of a keyboard;
   determining, by the computing device, based on the plurality of user inputs, at least one first word from a data entry dictionary maintained in a memory of the computing device;
   automatically receiving updated dictionary information for a particular geographic location that is associated with the at least one first word;
   adding, to the data entry dictionary and based on the updated dictionary information, at least one second word that is associated with the particular geographic location;
   updating, based on the updated dictionary information, concurrence probabilities for words maintained in the data entry dictionary;
   outputting, by the computing device, for display, the at least one first word; and
   outputting, by the computing device, for display and based at least in part on a respective concurrence probability of the at least one second word relative to the at least one first word, the at least one second word as a likely candidate for a follow-up word.

12. The method of claim 11, wherein updating the concurrence probabilities for words in the data entry dictionary comprises:
   increasing, by the computing device, a respective concurrence probability of the at least one first word relative to the at least one second word.

13. The method of claim 11, wherein outputting the at least one second word as the likely candidate term further comprises outputting the at least one second word as the likely candidate term in response to determining that the respective concurrence probability of the at least one second word relative to the at least one first word exceeds a respective concurrence probability of other words from the data entry dictionary relative to the at least one first word.

14. The method of claim 11, wherein updating the concurrence probabilities for words in the data entry dictionary comprises: decreasing, by the computing device, respective probabilities, relative to the at least one first word, of other words from the data entry dictionary that are not associated with the particular geographic location.

15. The method of claim 11, wherein the at least one first word is different than the at least one second word.

16. The method of claim 11, wherein automatically receiving updated dictionary information for a particular geographic location that is associated with the at least one first word comprises:
obtaining, from a positioning system, location information that indicates the computing device is at the particular geographic location; and
automatically receiving the updated dictionary information for the particular geographic location that is associated with the at least one first word in response to outputting the location information obtained from the positioning system.

17. The method of claim 11, further comprising:
decreasing the respective concurrence probability of the at least one second word relative to the at least one first word based on a distance traveled from the particular geographic location that is associated with the at least one first word.

18. A non-transitory, machine-readable medium encoded with instructions that, when executed, cause at least one processor of a computing device to:
receive a plurality of user inputs that each correspond to a respective location of a keyboard;
determine, based on the plurality of user inputs, at least one first word from a data entry dictionary maintained in a memory of the computing device;
automatically receive updated dictionary information for a particular geographic location that is associated with the at least one first word;
adding, to the data entry dictionary and based on the updated dictionary information, at least one second word that is associated with the particular geographic location;
updating, based on the updated dictionary information, concurrence probabilities for words maintained in the data entry dictionary;
output, for display, the at least one first word;
output, for display and based at least in part on a respective concurrence probability of the at least one second word relative to the at least one first word, the at least one second word as a likely candidate for a follow-up word.

19. The non-transitory, machine-readable medium of claim 18, wherein the non-transitory, machine-readable medium of claim is further encoded with instructions that, when executed, cause the at least one processor of the computing device to update the concurrence probabilities for words in the data entry dictionary by:
increasing a respective concurrence probability of the at least one first word relative to the at least one second word.

20. The non-transitory, machine-readable medium of claim 18, wherein the instructions, when executed, cause the at least one processor to output the at least one second word as the likely candidate term further in response to determining that the respective concurrence probability of the at least one second word relative to the at least one first word exceeds a respective concurrence probability of other words from the data entry dictionary relative to the at least one first word.

21. The non-transitory, machine-readable medium of claim 18, wherein the non-transitory, machine-readable medium of claim is further encoded with instructions that, when executed, cause the at least one processor of the computing device to update the concurrence probabilities for words in the data entry dictionary by decreasing respective probabilities, relative to the at least one first word, of other words from the data entry dictionary that are not associated with the particular geographic location.

\* \* \* \* \*